United States Patent
Kaneko et al.

(10) Patent No.: US 10,647,205 B2
(45) Date of Patent: May 12, 2020

(54) BRAKING CONTROL APPARATUS

(71) Applicant: Hitachi Automotive Systems, Ltd., Hitachinaka-shi, Ibaraki (JP)

(72) Inventors: Satoshi Kaneko, Atsugi (JP); Keisuke Suzuki, Kawasaki (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 113 days.

(21) Appl. No.: 15/760,794

(22) PCT Filed: Jul. 25, 2016

(86) PCT No.: PCT/JP2016/071670
§ 371 (c)(1),
(2) Date: Mar. 16, 2018

(87) PCT Pub. No.: WO2017/047231
PCT Pub. Date: Mar. 23, 2017

(65) Prior Publication Data
US 2018/0264949 A1 Sep. 20, 2018

(30) Foreign Application Priority Data

Sep. 18, 2015 (JP) ................................. 2015-184789

(51) Int. Cl.
*B60T 7/12* (2006.01)
*B60L 7/26* (2006.01)
(Continued)

(52) U.S. Cl.
CPC .................. *B60L 7/26* (2013.01); *B60L 7/18* (2013.01); *B60L 7/24* (2013.01); *B60L 15/2009* (2013.01);
(Continued)

(58) Field of Classification Search
CPC .......... B60L 7/26; B60L 7/18; B60L 15/2009; B60L 2240/12; B60L 2250/26;
(Continued)

(56) References Cited

U.S. PATENT DOCUMENTS

2012/0074768 A1* 3/2012 Naito ........................ B60T 1/10
303/3
2013/0062932 A1* 3/2013 Yagashira ............... B60T 8/442
303/3

(Continued)

FOREIGN PATENT DOCUMENTS

JP 2013-18411 A 1/2013
JP 2014-108745 A 6/2014
(Continued)

OTHER PUBLICATIONS

International Search Report (PCT/ISA/210) issued in PCT Application No. PCT/JP2016/071670 dated Oct. 25, 2016 with English-language translation (five (5) pages).
(Continued)

*Primary Examiner* — Shardul D Patel
(74) *Attorney, Agent, or Firm* — Crowell & Moring LLP

(57) ABSTRACT

The present invention provides a braking control apparatus capable of preventing or reducing a change in a deceleration of a vehicle. The braking control apparatus is configured to change a braking force to be generated by a frictional braking device so as to achieve a calculated target braking force, and generate a braking force corresponding to a difference between the braking force to be generated by the frictional braking device and the target braking force with use of an electric braking device, when a predetermined condition is satisfied.

9 Claims, 7 Drawing Sheets

(51) Int. Cl.
*B60W 10/18* (2012.01)
*B60L 7/24* (2006.01)
*B60W 20/00* (2016.01)
*B60W 10/08* (2006.01)
*B60T 8/1761* (2006.01)
*B60T 1/10* (2006.01)
*B60L 7/18* (2006.01)
*B60L 15/20* (2006.01)
*B60T 7/04* (2006.01)
*B60T 8/176* (2006.01)
*B60T 8/72* (2006.01)
*B60T 13/74* (2006.01)

(52) U.S. Cl.
CPC ............... *B60T 1/10* (2013.01); *B60T 7/042* (2013.01); *B60T 8/176* (2013.01); *B60T 8/17616* (2013.01); *B60T 8/72* (2013.01); *B60T 13/746* (2013.01); *B60W 10/08* (2013.01); *B60W 10/18* (2013.01); *B60W 20/00* (2013.01); B60L 2240/12 (2013.01); B60L 2250/26 (2013.01); B60T 2220/04 (2013.01); B60T 2270/602 (2013.01); B60T 2270/604 (2013.01); Y02T 10/7258 (2013.01)

(58) Field of Classification Search
CPC . B60L 7/24; B60T 7/042; B60T 8/176; B60T 8/72; B60T 13/746; B60T 2220/04; B60T 2270/602; B60T 2270/604; B60T 1/10; B60T 8/17616; Y02T 10/7258; B60W 10/08; B60W 10/18; B60W 20/00

USPC .................................. 701/22, 78; 303/3, 11
See application file for complete search history.

(56) References Cited

U.S. PATENT DOCUMENTS

2014/0054955 A1* 2/2014 Ninoyu ................. B60T 8/4872
  303/11
2015/0314686 A1* 11/2015 Knechtges ............... B60T 1/10
  303/3
2016/0152143 A1* 6/2016 Nakamura ............... B60L 7/14
  701/22

FOREIGN PATENT DOCUMENTS

| JP | 2015-80325 A | 4/2015 |
| JP | 2015-140080 A | 8/2015 |
| JP | 2015-143073 A | 8/2015 |
| WO | WO 2011/154801 A1 | 12/2011 |
| WO | WO 2014/082885 A1 | 6/2014 |
| WO | WO 2015/015931 A1 | 2/2015 |
| WO | WO 2015/114430 A1 | 8/2015 |
| WO | WO 2015/114438 A1 | 8/2015 |

OTHER PUBLICATIONS

Japanese-language Written Opinion (PCT/ISA/237) issued in PCT Application No. PCT/JP2016/071670 dated Oct. 25, 2016 (four (4) pages).
Extended European Search Report issued in counterpart European Application No. 16846104.4 dated Aug. 1, 2018 (nine pages).

* cited by examiner

BRAKING CONTROL APPARATUS

TECHNICAL FIELD

The present invention relates to a braking control apparatus.

BACKGROUND ART

As this kind of technique, there is a technique disclosed in the following patent literature, PTL 1. PTL 1 discloses a vehicle braking apparatus that increases a hydraulic braking force according to a reduction in a regenerative braking force when regenerative braking is replaced with hydraulic braking.

CITATION LIST

Patent Literature

PTL 1: Japanese Patent Application Public Disclosure No. 2013-018411

SUMMARY OF INVENTION

Technical Problem

Regarding the technique disclosed in the above-described patent literature, PTL 1, the hydraulic braking is slow to respond to an instruction value to reflect it into an actual braking force, which may cause a change of the braking force at the time of replacement control and thus a change in a deceleration of a vehicle.

The present invention has been made in consideration of the above-described drawback, and an object thereof is to provide a braking control apparatus capable of preventing or reducing the change in the deceleration of the vehicle.

Solution to Problem

To achieve the above-described object, a first aspect of the present invention is configured to change a braking force to be generated by a frictional braking device so as to achieve a calculated target braking force, and generate a braking force corresponding to a difference between the braking force to be generated by the frictional braking device and the target braking force with use of an electric braking device, when a predetermined condition is satisfied.

A second aspect of the present invention is configured to activate a regenerative braking device and a frictional braking device so as to achieve a calculated target braking force, and perform replacement control of increasing a braking force to be generated by the frictional braking device so as to achieve the calculated target braking force and generating a braking force corresponding to a difference between the braking force to be generated by the frictional braking device and the target braking force with use of the regenerative braking device when a predetermined condition is satisfied.

A third aspect of the present invention is configured to issue a braking force instruction to a regenerative braking device and/or a frictional braking device provided to a vehicle so as to achieve a calculated target braking force, change a braking force to be generated by the regenerative braking device so as to achieve the calculated target braking force and generate a braking force corresponding to a difference between the braking force to be generated by the regenerative braking device and the target braking force with use of the frictional braking device before a predetermined condition is satisfied, and perform replacement control by changing a braking force to be generated by the frictional braking device so as to achieve the calculated target braking force and generating a braking force corresponding to a difference between the braking force to be generated by the frictional braking device and the target braking force with use of the regenerative braking device when the predetermined condition is satisfied.

Advantageous Effects of Invention

Therefore, the change in the deceleration of the vehicle can be prevented or reduced.

DESCRIPTION OF EMBODIMENTS

Figure 1:
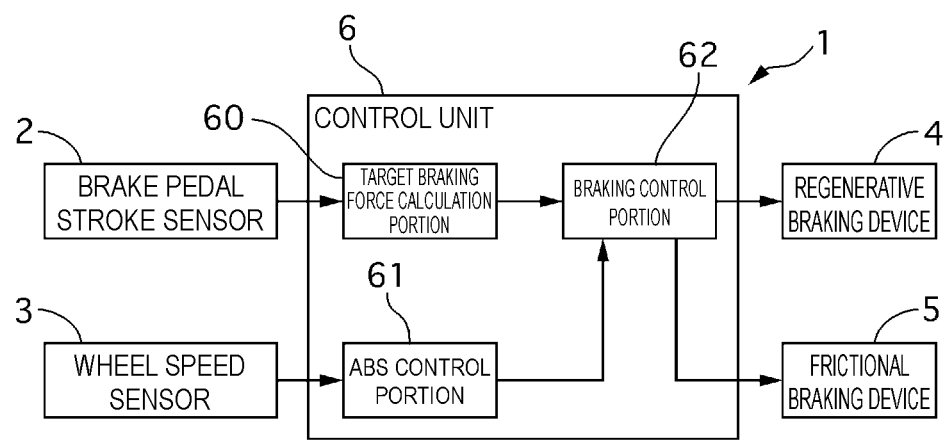
FIG. 1 is a system diagram of a braking control apparatus according to a first embodiment.

[First Embodiment]
[Configuration of Braking Control Apparatus]
FIG. 1 is a system diagram of a braking control apparatus 1. The braking control apparatus 1 according to a first embodiment is used for a hybrid vehicle including an engine and a motor as a driving source or an electric vehicle including only a motor as a driving source. The braking control apparatus 1 includes a brake pedal stroke sensor 2, a wheel speed sensor 3, a regenerative braking device 4, a frictional braking device 5, and a control unit 6. The brake pedal stroke sensor 2 detects a stroke amount of a brake pedal. The wheel speed sensor 3 detects a wheel speed of each of wheels of the vehicle. The regenerative braking device 4 carries out regenerative braking with use of the motor serving as the driving source. The frictional braking device 5 carries out frictional braking with use of a brake hydraulic pressure. The control unit 6 controls the regenerative braking device 4 and the frictional braking device 5.

The control unit 6 includes a target braking force calculation portion 61, an anti-lock brake control portion 61, and a braking control portion 62. The target braking force calculation portion 60 calculates a target braking force according to the brake pedal stroke. The anti-lock brake control portion 61 performs anti-lock brake control of the wheels. The braking control portion 62 outputs an instruction braking force to each of the regenerative braking device 4 and the frictional braking device 5.

The braking control portion 62 outputs an instruction regenerative braking force to the regenerative braking device 4 and an instruction frictional braking force to the frictional braking device 5 so as to generate the target braking force calculated by the target braking force calculation portion 60.

Figure 2:
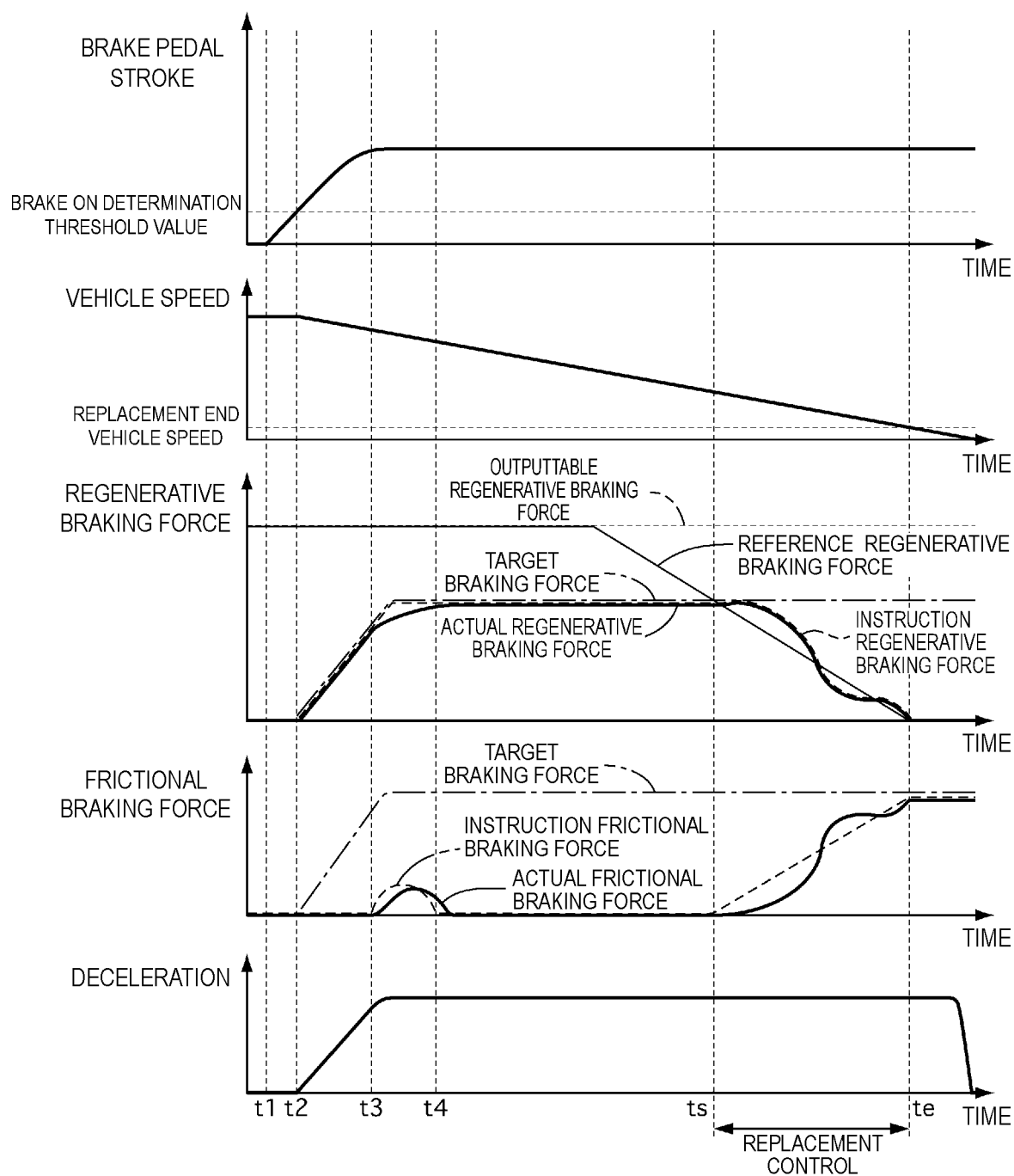
FIG. 2 is a timing chart of the first embodiment.

[Operation of Each Braking Device]
FIG. 2 is a timing chart of the brake pedal stroke, a vehicle speed, a regenerative braking force, a frictional braking force, and a deceleration.

When the vehicle is braked, the braking control apparatus 1 brakes the vehicle with use of the regenerative braking device 4 whenever possible to increase an amount of collected electric power. However, an attempt to stop the vehicle with use of only the braking force of the regenerative braking device 4 results in an increase in a braking distance due to presence of an inertial force of the motor. This raises a necessity of performing replacement control of switching the braking from the braking with use of the regenerative braking device 4 to the braking with use of the frictional braking device 5 before the vehicle is stopped.

A start (ts) of the replacement control is set to a time before a predetermined time relative to a time (te) when the vehicle speed reaches a replacement end vehicle speed at which the replacement control is ended. In other words, the start (ts) of the replacement control is set to such a time that the vehicle speed would reach the replacement end vehicle speed after the predetermined time (at the time (te)). This means that the start of the replacement control can be determined from the vehicle speed and the deceleration. As illustrated in the timing chart of the regenerative braking force in FIG. 2, a replacement reference value is set in such a manner that the regenerative braking force reaches zero by the replacement end time te. The braking control portion 62 controls the braking force in such a manner that the regenerative braking force does not exceed the replacement reference value.

Further, a regenerative braking force that can be output (an outputtable regenerative braking force) is set according to, for example, a charging capacity of a battery. The braking control portion 62 controls the braking force in such a manner that the regenerative braking force does not exceed the outputtable regenerative braking force. In FIG. 2, the outputtable regenerative braking force is assumed to be constant.

At time t1, a driver presses the brake pedal, and the brake pedal stroke is generated. The target braking force calculation portion 60 outputs zero as the target braking force because the brake pedal stroke does not exceed a brake ON determination threshold value until time t2.

At time t2, when the brake pedal stroke exceeds the brake ON determination threshold value, the target braking force calculation portion 60 sets the target braking force in such a manner that the target braking force increases according to an increase in the brake stroke.

Before the replacement control (time t2 to ts), the instruction regenerative braking force is set to the target braking force. The instruction frictional braking force is set to a difference between the target braking force and an actual regenerative braking force. In other words, the braking control apparatus 1 operates so as to perform the control to realize the target braking force with use of the regenerative braking force, and also compensate for an amount by which the actual regenerative braking force falls short of the target braking force with the frictional braking force (time t3 to t4).

During the replacement control (time ts to te), the instruction regenerative braking force is set to the replacement reference value. The instruction frictional braking force is set to be consistent with a regenerative braking force reduced from the target braking force. In other words, the instruction frictional braking force is set according to a difference between the target braking force and the replacement reference value. However, an actual frictional braking force is little responsive to the instruction frictional braking force, and therefore may shift or deviate from the instruction braking force. Therefore, during the replacement control, a braking force corresponding to a difference between the target braking force and the actual frictional braking force is set as the instruction regenerative braking force. In other words, the braking control apparatus 1 operates so as to compensate for a braking force corresponding to the shift of the actual frictional braking force from the instruction frictional braking force with the regenerative braking force. By this operation, the braking control apparatus 1 can prevent or reduce a change in the deceleration due to the failure of the actual frictional braking force to follow the instruction frictional braking force although the actual regenerative braking force may exceed the replacement reference value.

[Functions]

Figure 3:
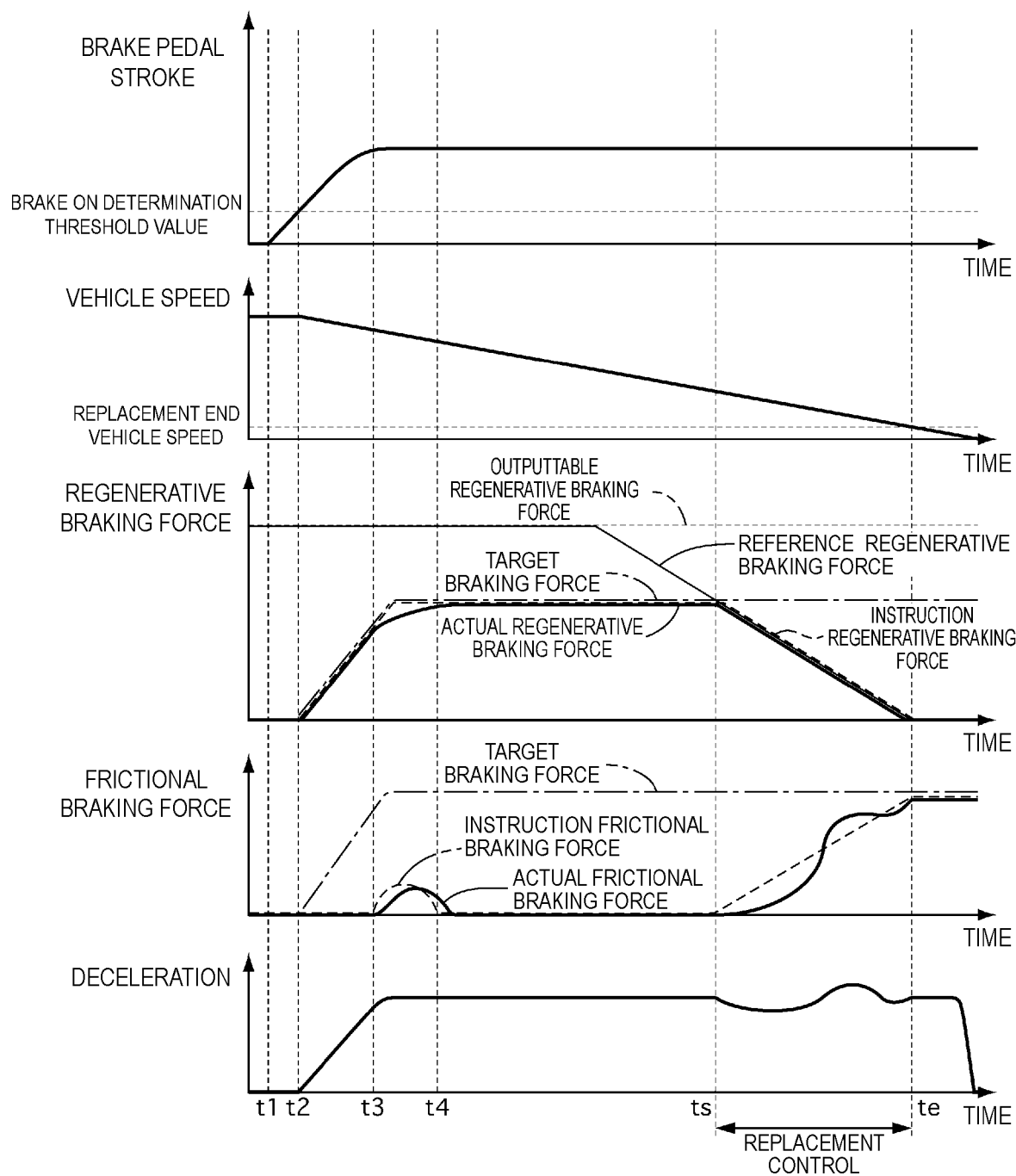
FIG. 3 is a timing chart of the first embodiment.

FIG. 3 is a timing charge when the braking force corresponding to the shift of the actual frictional braking force from the instruction frictional braking force is not compensated for with the regenerative braking force during the replacement control. As illustrated in FIG. 3, the actual frictional braking force shifts from the instruction frictional braking force, and therefore the braking force corresponding to this shift constitutes the change in the deceleration. Therefore, this control may cause the driver to feel uncomfortable.

Therefore, in the first embodiment, the braking control apparatus 1 is configured to change the frictional braking force so as to achieve the calculated target braking force, and generate the braking force corresponding to the difference between the actual frictional braking force and the target braking force as the regenerative braking force, during the replacement control. By this configuration, the braking control apparatus 1 can prevent or reduce the shift of the braking force as a sum of the actual regenerative braking force and the actual frictional braking force from the target braking force, thereby preventing or reducing the change in the deceleration of the vehicle.

Further, in the first embodiment, the braking control apparatus 1 is configured to increase the frictional braking force and reduce the regenerative braking force during the replacement control. By this configuration, the braking control apparatus 1 can stop the vehicle with use of the frictional braking force, thereby reducing a distance required to stop the vehicle, when stopping the vehicle.

Further, in the first embodiment, the braking control apparatus 1 is configured to set a gradient of the increase in the instruction frictional braking force according to a gradient of the reduction in the instruction regenerative braking force, and compensate for the braking force corresponding to the shift of the actual frictional braking force with the regenerative braking force, during the replacement control. By this configuration, the braking control apparatus 1 can prevent or reduce the shift of the braking force as the sum of the actual regenerative braking force and the actual frictional braking force from the target braking force, thereby preventing or reducing the change in the deceleration of the vehicle.

Further, in the first embodiment, before the replacement control, the braking control apparatus 1 sets the braking force corresponding to the difference between the target braking force and the actual regenerative braking force as the instruction frictional braking force. By this configuration, the braking control apparatus 1 can cause the regenerative braking device 4 to generate the braking force as much as possible, thereby improving efficiency of collecting energy.

Further, in the first embodiment, the braking control apparatus 1 is configured to start the replacement control at such a time that the vehicle speed would reach or fall below the predetermined vehicle speed after the predetermined time period has elapsed since this time. By this configuration, the braking control apparatus 1 can reduce the distance required to stop the vehicle while improving the efficiency of collecting energy.

[Effects]

(1) The braking control apparatus 1 for the vehicle includes the regenerative braking device 4 (an electric braking device) configured to generate the regenerative braking force (an electric braking force) on the wheels, the frictional braking device 5 configured to generate the frictional braking force on the wheels by being activated, the target braking force calculation portion 60 configured to calculate the target braking force, and the braking control portion 62 configured to change the braking force to be generated by the frictional braking device 5 so as to achieve the calculated target braking force and generate the braking force corresponding to the difference between the braking force to be generated by the frictional braking device 5 and the target braking force with use of the regenerative braking device 4 when the predetermined condition is satisfied.

Therefore, the braking control apparatus 1 can prevent or reduce the shift of the braking force as the sum of the actual regenerative braking force and the actual frictional braking force from the target braking force, thereby preventing or reducing the change in the deceleration of the vehicle.

(2) The braking control portion 62 is configured to increase the braking force to be generated by the frictional braking device 5 and reduce the braking force to be generated by the regenerative braking device 4, when the predetermined condition is satisfied.

Therefore, the braking control apparatus 1 can stop the vehicle with use of the frictional braking force, thereby reducing the distance required to stop the vehicle, when stopping the vehicle.

(3) The braking control portion 62 is configured to set the gradient of the increase in the braking force to be generated by the frictional braking device 5 according to the gradient of the reduction in the braking force to be generated by the regenerative braking device when the predetermined condition is satisfied, and compensate for the braking force corresponding to the shift of the frictional braking device 5 with the braking force to be generated by the regenerative braking device 4.

Therefore, the braking control apparatus 1 can prevent or reduce the shift of the braking force as the sum of the actual regenerative braking force and the actual frictional braking force from the target braking force, thereby preventing or reducing the change in the deceleration of the vehicle.

(4) The braking control portion 62 is configured to generate the braking force corresponding to the difference between the calculated target braking force and the braking force to be generated by the regenerative braking device 4 with use of the frictional braking device 5, before the predetermined condition is satisfied.

Therefore, the braking control apparatus 1 can cause the regenerative braking device 4 to generate the braking force as much as possible, thereby improving the efficiency of collecting energy.

(5) The predetermined condition is the condition based on when the vehicle speed reaches or falls below the predetermined vehicle speed.

Therefore, the braking control apparatus 1 can reduce the distance required to stop the vehicle while improving the efficiency of collecting energy.

(6) The braking control apparatus 1 for the vehicle includes the regenerative braking device 4 configured to generate the regenerative braking force on the wheels, the frictional braking device 5 configured to generate the frictional braking force on the wheels by being activated, the target braking force calculation portion 60 configured to calculate the target braking force according to the brake operation amount input by the driver, and the braking control portion 62 configured to activate the regenerative braking device 4 and the frictional braking device 5 so as to achieve the calculated target braking force, and perform replacement control of increasing the braking force to be generated by the frictional braking device 5 so as to achieve the calculated target braking force and generating the braking force corresponding to the difference between the braking force to be generated by the frictional braking device 5 and the target braking force with use of the regenerative braking device 4 when the predetermined condition is satisfied.

Therefore, the braking control apparatus 1 can prevent or reduce the shift of the braking force as the sum of the actual regenerative braking force and the actual frictional braking force from the target braking force, thereby preventing or reducing the change in the deceleration of the vehicle.

(7) The braking control portion 62 is configured to set the gradient of the increase in the braking force to be generated by the frictional braking device 5 according to the gradient of the reduction in the braking force to be generated by the regenerative braking device 4 when the replacement control is started, and compensate for the braking force corresponding to the shift of the braking force to be generated by the frictional braking device 5 with the braking force to be generated by the regenerative braking device 4.

Therefore, the braking control apparatus 1 can prevent or reduce the shift of the braking force as the sum of the actual regenerative braking force and the actual frictional braking force from the target braking force, thereby preventing or reducing the change in the deceleration of the vehicle.

(8) The braking control apparatus 1 for the vehicle includes the target braking force calculation portion 60 configured to calculate the target braking force according to the brake operation amount input by the driver, and the braking control portion 62. The braking control portion 62 is configured to issue the braking force instruction to the regenerative braking device 4 and/or the frictional braking device 5 provided to the vehicle so as to achieve the calculated target braking force, change the braking force to be generated by the regenerative braking device 4 so as to achieve the calculated target braking force and generate the braking force corresponding to the difference between the braking force to be generated by the regenerative braking device 4 and the target braking force with use of the frictional braking device 5 before the predetermined condition is satisfied, and perform the replacement control by changing the braking force to be generated by the frictional braking device 5 so as to achieve the calculated target braking force and generating the braking force corresponding to the difference between the braking force to be generated by the frictional braking device 5 and the target braking force with use of the regenerative braking device 4 when the predetermined condition is satisfied.

Therefore, the braking control apparatus 1 can prevent or reduce the shift of the braking force as the sum of the actual regenerative braking force and the actual frictional braking force from the target braking force, thereby preventing or reducing the change in the deceleration of the vehicle. Further, the braking control apparatus 1 can cause the regenerative braking device 4 to generate the braking force as much as possible, thereby improving the efficiency of collecting energy.

(9) The target braking force is calculated according to the brake operation amount input by the driver. The braking control portion 62 is configured to perform the control so as to increase the braking force to be generated by the frictional braking device 5 and reduce the braking force to be generated by the regenerative braking device 4, when the brake operation amount increases after the replacement control is started.

Therefore, the braking control apparatus 1 can stop the vehicle with use of the frictional braking force, thereby reducing the distance required to stop the vehicle, when stopping the vehicle.

[Second Embodiment]

A second embodiment will be described as control of the regenerative braking force and the frictional braking force when the anti-lock brake control intervenes before the replacement control is started. A system configuration of the braking control apparatus 1 is similar to the first embodiment, but a content of control is partially different from the first embodiment. In the following description, the second embodiment will be described focusing on only differences from the first embodiment.

Figure 4:
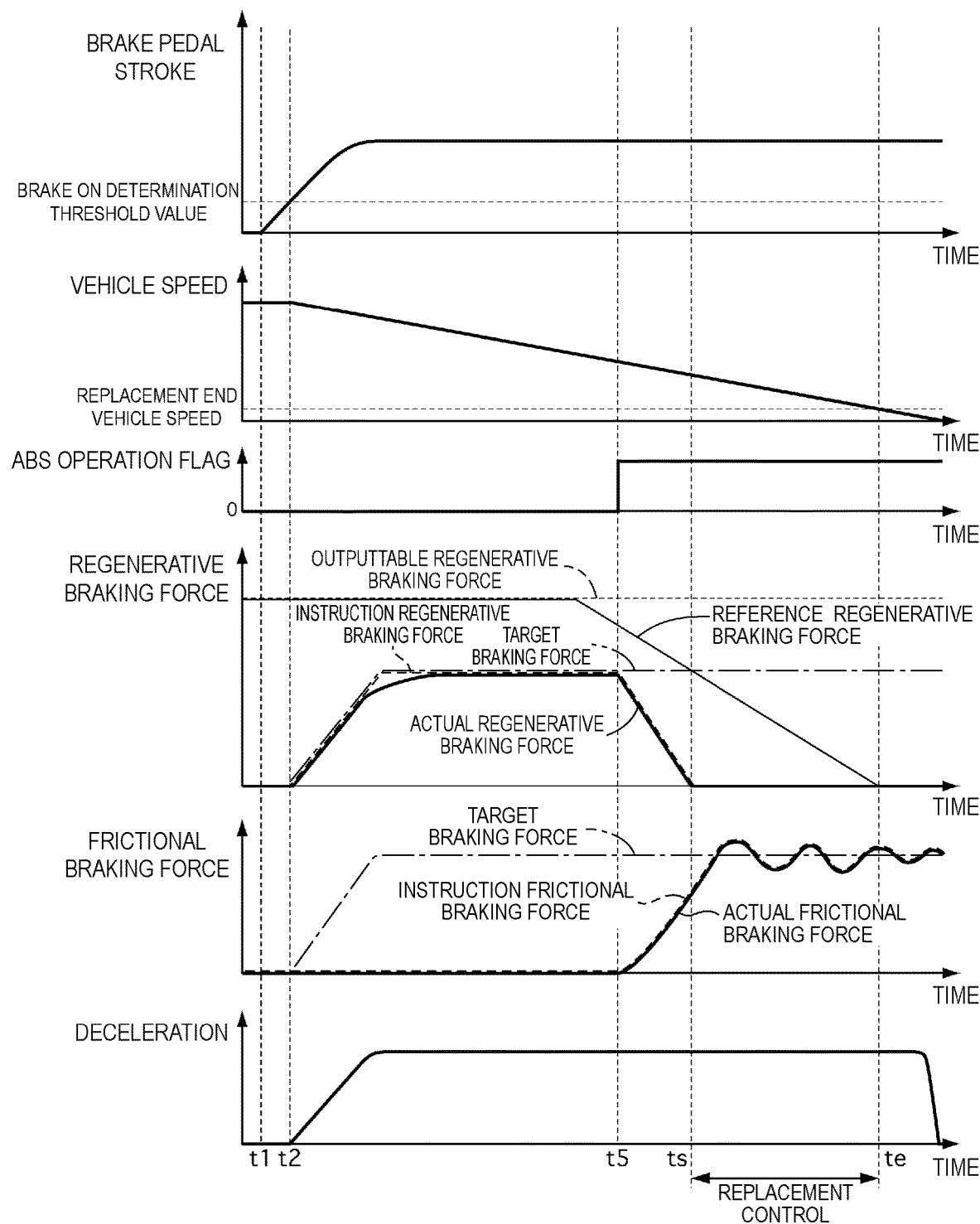
FIG. 4 is a timing chart of a second embodiment.

FIG. 4 is a timing chart of the brake pedal stroke, the vehicle speed, the regenerative braking force, the frictional braking force, and the deceleration.

At time t5, when the anti-lock brake control intervenes, the braking control apparatus 1 reduces the regenerative braking force even before the replacement control. At this time, the braking control apparatus 1 sets a reduction rate of the regenerative braking force in such a manner that an increase rate of the frictional braking force can follow the reduction rate of the regenerative braking force. When the frictional braking force increases to around the target braking force, the braking control apparatus 1 increases and reduces a brake hydraulic pressure of a wheel targeted for the anti-lock brake control according to an instruction from the anti-lock brake control portion 61.

[Effects]

(10) The braking control apparatus 1 for the vehicle further includes the anti-lock brake control portion 61. The braking control portion 62 is configured to reduce the braking force to be generated by the regenerative braking device 4 and perform the anti-lock brake control with use of the frictional braking device 5, when the anti-lock brake control intervenes.

Therefore, the braking control apparatus 1 can easily perform the anti-lock brake control by stopping the braking with use of the regenerative braking apparatus 4 and braking the vehicle with use of only the frictional braking device 5 during the anti-lock brake control.

[Third Embodiment]

A third embodiment will be described as control of the regenerative braking force and the frictional braking force when a sudden braking operation is performed by the driver. A system configuration of the braking control apparatus 1 is similar to the first embodiment, but a content of control is partially different from the first embodiment. In the following description, the third embodiment will be described focusing on only differences from the first embodiment.

Figure 5:
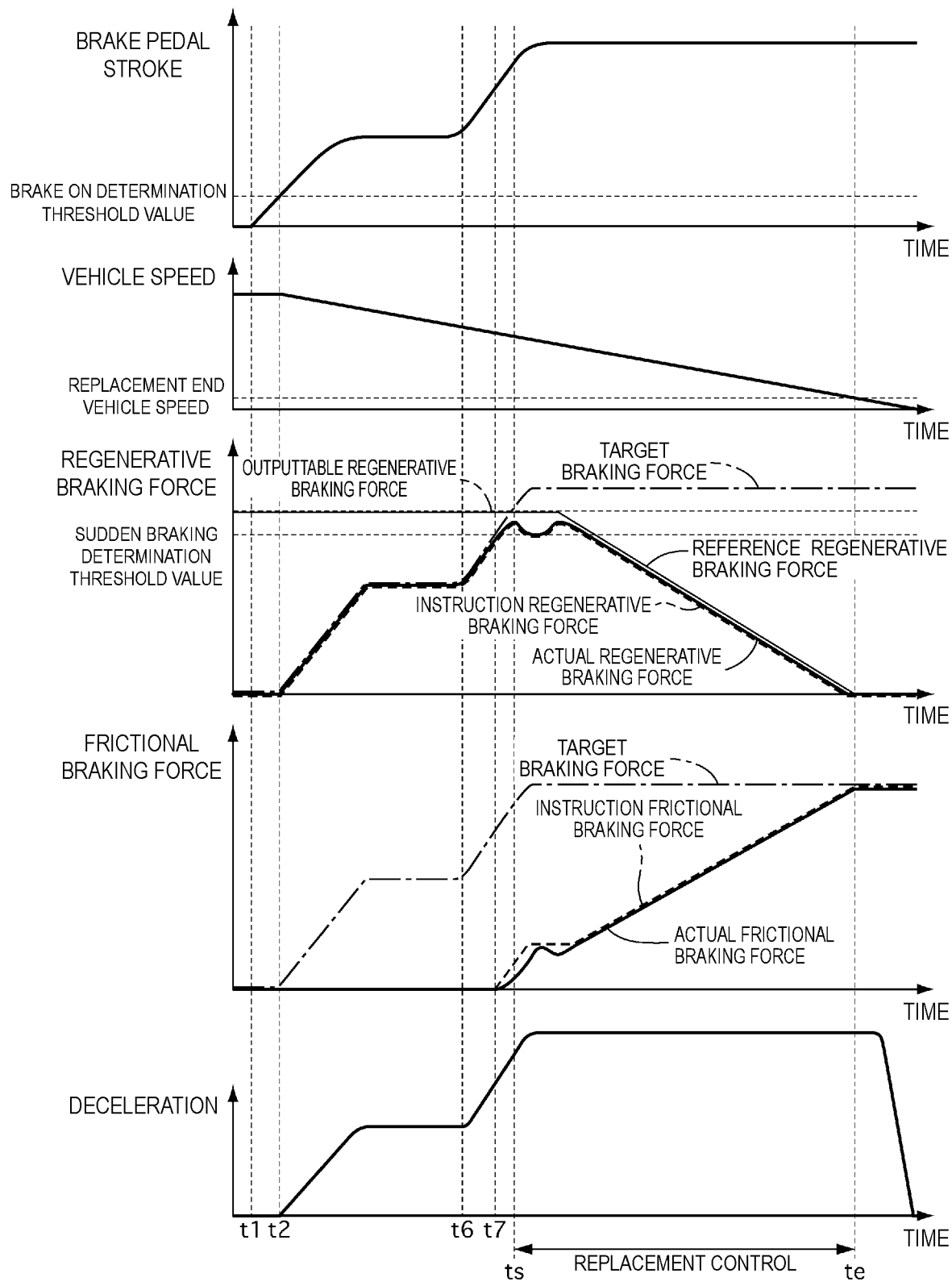
FIG. 5 is a timing chart of a third embodiment.

FIG. 5 is a timing chart of the brake pedal stroke, the vehicle speed, the regenerative braking force, the frictional braking force, and the deceleration.

At time t6, the driver increasingly presses the brake pedal. Then, at time t7, the target braking force exceeds a sudden braking determination threshold value, and a sudden braking operation is determined to be performed. When the sudden braking operation is determined to be performed, the braking control apparatus 1 increases the frictional braking force.

At time ts, the target braking force exceeds the reference regenerative braking force, and the replacement control is started. Even after the replacement control is started, the driver continues the increased pressing of the brake pedal. The instruction regenerative braking force is set so as to reduce the regenerative braking force. The instruction frictional braking force is set so as to output the braking force corresponding to the difference between the target braking force and the actual regenerative braking force. At this time, the instruction regenerative braking force is set so as to compensate for the shift of the actual frictional braking force.

[Effects]

(11) The target braking force is calculated according to the brake operation amount input by the driver. The braking control portion 62 is configured to achieve the target braking force by increasing the braking force to be generated by the frictional braking device 5 and reducing the braking force to be generated by the regenerative braking device 4, when the brake operation amount increases after the predetermined condition is satisfied.

Therefore, the braking control apparatus 1 can achieve the target braking force even when the brake pedal is increasingly pressed after the replacement control is started.

[Other Embodiments]

Having described the present invention based on the first to third embodiments, the specific configuration of each invention is not limited to the first to third embodiments, and the present invention also includes even a design modification and the like thereof made within a range that does not deviate from the spirit of the present invention.

There is a space between brake pads and a brake rotor, and therefore the actual frictional braking force is not generated in some hydraulic range even when the brake hydraulic pressure is generated. The brake control apparatus may be configured to refrain from reducing the regenerative braking force when the brake hydraulic pressure falls within the hydraulic range where the actual frictional braking force is not generated even after the replacement control is started.

Figure 6:
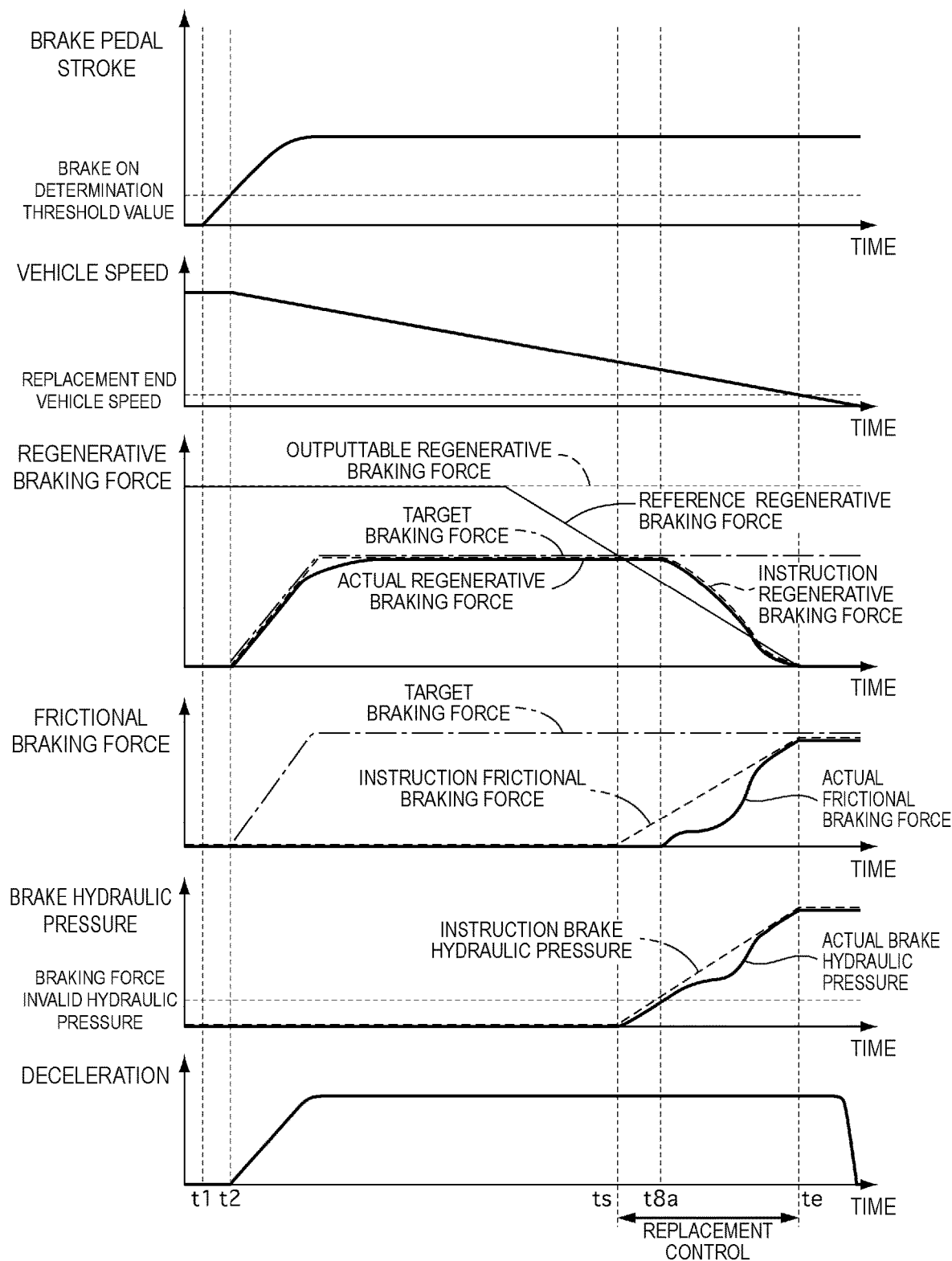
FIG. 6 is a timing chart of another embodiment.

FIG. 6 is a timing chart of the brake pedal stroke, the vehicle speed, the regenerative braking force, the frictional braking force, and the deceleration.

The braking control apparatus is configured to refrain from reducing the regenerative braking force after the replacement control is started (after time ts) until the brake hydraulic pressure exceeds a braking force invalid hydraulic pressure (until time t8). By this configuration, the braking control apparatus can secure the braking force with use of the regenerative braking force even when the frictional braking force is not generated.

Further, the braking control apparatus may be configured to reduce the regenerative braking force and increase the frictional braking force even before the replacement control, when the target braking fore exceeds the outputtable regenerative braking force before the replacement control.

Figure 7:
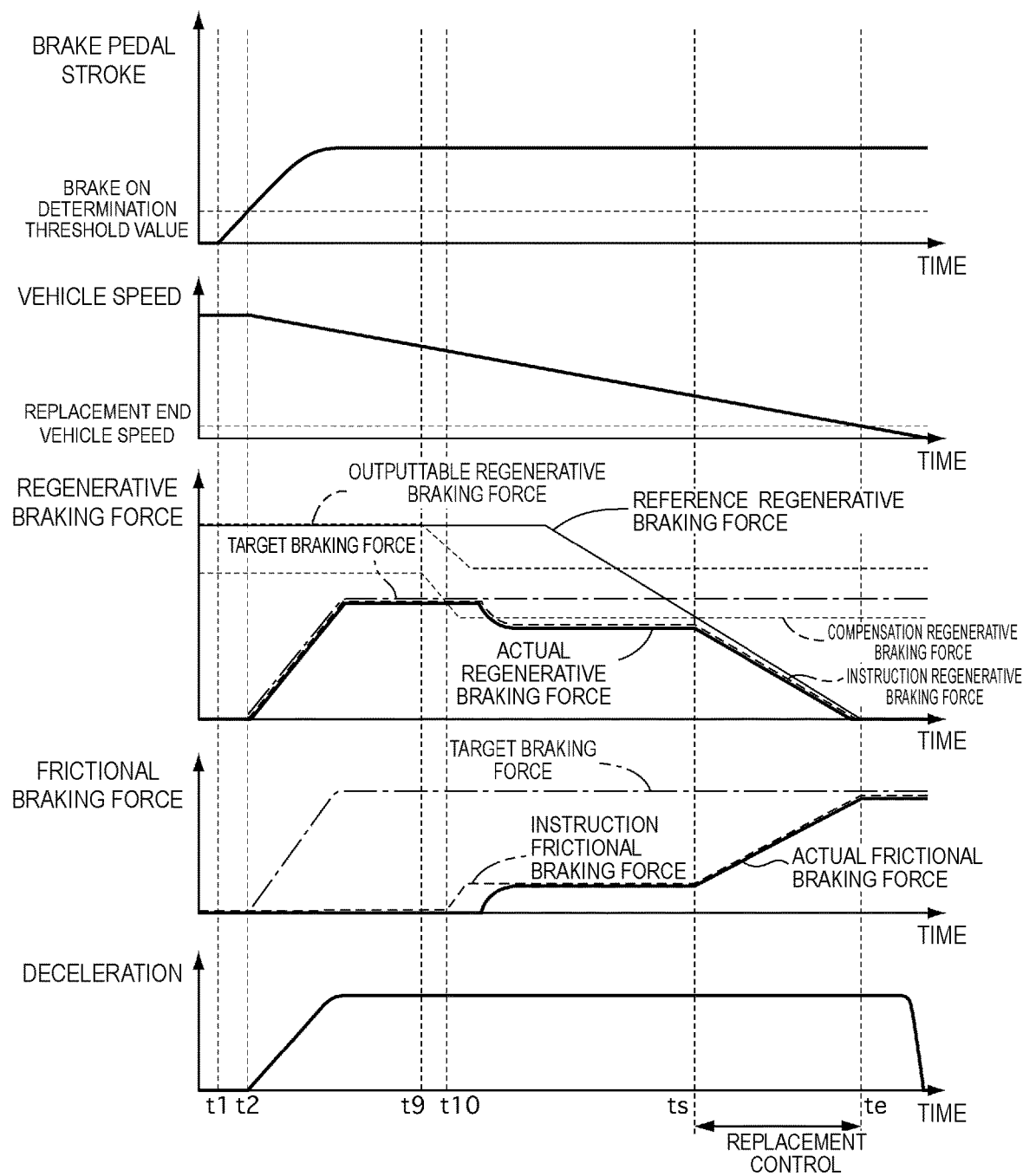
FIG. 7 is a timing chart of another embodiment.

FIG. 7 is a timing chart of the brake pedal stroke, the vehicle speed, the regenerative braking force, the frictional braking force, and the deceleration.

In FIG. 7, the braking control apparatus sets a smaller value than the outputtable braking force by a predetermined braking force as a compensation regenerative braking force. The compensation regenerative braking force is set to limit the regenerative braking force before the instruction regenerative braking force exceeds the outputtable braking force so as to prevent the actual regenerative braking force from exceeding the outputtable braking force.

At time t9, the outputtable braking force starts reducing, and the compensation regenerative braking force also starts reducing according thereto. The outputtable braking force is set according to, for example, the charging capacity of the battery, and is set to a braking force reducing as the charging capacity of the battery approaches a fully charged state.

At time t10, the target braking force exceeds the compensation regenerative braking force. The braking control apparatus increases the instruction frictional braking force to reduce the regenerative braking force, but the actual frictional braking force increases late with respect to the instruction frictional braking force. The instruction regenerative braking force at this time is set in such a manner that the regenerative braking force does not reduce until the actual frictional braking force starts increasing. The instruction regenerative braking force is set in such a manner that, when the actual frictional braking force starts increasing, the regenerative braking force reduces according to this increase.

As a result, the braking control apparatus can compensate for the delay in the response of the frictional braking force with the regenerative braking force even when the regenerative braking force exceeds the outputtable regenerative braking force (the compensation regenerative braking force).

Having described merely several embodiments of the present invention, those skilled in the art will be able to easily appreciate that the embodiments described as the examples can be modified or improved in various manners without substantially departing from the novel teachings and advantages of the present invention. Therefore, such modified or improved embodiments are intended to be also contained in the technical scope of the present invention.

The present application claims priority under the Paris Convention to Japanese Patent Application No. 2015-184789 filed on Sep. 18, 2015. The entire disclosure of Japanese Patent Application No. 2015-184789 filed on Sep. 18, 2015 including the specification, the claims, the drawings, and the abstract is incorporated herein by reference in its entirety.

The entire disclosure of Japanese Patent Application Public Disclosure No. 2013-018411 (PTL 1) including the specification, the claims, the drawings, and the abstract is incorporated herein by reference in its entirety.

REFERENCE SIGN LIST 1 braking control apparatus
4 regenerative braking device (electric braking device)
5 frictional braking device
60 target braking force calculation portion
61 anti-lock brake control portion
62 braking control portion

The invention claimed is:

1. A braking control apparatus for a vehicle, comprising:
a regenerative braking device configured to generate a regenerative braking force on a wheel;
a frictional braking device configured to generate a frictional braking force on the wheel by being activated;
a target braking force calculation portion configured to calculate a target braking force; and
a braking control portion configured to output an instruction regenerative braking force to the regenerative braking device and an instruction frictional braking force to the frictional braking device so as to achieve the calculated target braking force, wherein
when a vehicle speed reaches or falls below a predetermined vehicle speed:
the braking control portion increases the braking force to be generated by the frictional braking device and reduces the braking force to be generated by the regenerative braking device, and
the braking control portion sets a gradient of the increase in the braking force to be generated by the frictional braking device according to a gradient of the reduction in the braking force to be generated by the regenerative braking device, and compensates for a braking force corresponding to a shift of the actual frictional braking force from the instruction frictional braking force of the frictional braking device with the braking force to be generated by the regenerative braking device.

2. The braking control apparatus for the vehicle according to claim 1, wherein the braking control portion generates a braking force corresponding to a difference between the calculated target braking force and the braking force to be generated by the regenerative braking device with use of the frictional braking device, before a vehicle speed reaches or falls below a predetermined vehicle speed.

3. The braking control apparatus for the vehicle according to claim 1, wherein
the target braking force is calculated according to a brake operation amount input by a driver, and
the braking control portion achieves the target braking force by increasing the braking force to be generated by the frictional braking device and reducing the braking force to be generated by the regenerative braking device, when the brake operation amount increases after a vehicle speed reaches or falls below a predetermined vehicle speed.

4. A braking control apparatus for a vehicle, comprising:
a regenerative braking device configured to generate a regenerative braking force on a wheel;
a frictional braking device configured to generate a frictional braking force on the wheel by being activated;
a target braking force calculation portion configured to calculate a target braking force according to a brake operation amount input by a driver; and
a braking control portion configured to output an instruction regenerative braking force to the regenerative braking device and an instruction frictional braking force to the frictional braking device, so as to achieve the calculated target braking force, and when a vehicle speed reaches or falls below a predetermined vehicle speed the braking control portion performs replacement control of:
increasing the braking force to be generated by the frictional braking device so as to achieve the calculated target braking force,
generating a braking force corresponding to a difference between the braking force to be generated by the frictional braking device and the target braking force with use of the regenerative braking device, and
compensating for a braking force corresponding to a shift of the actual frictional braking force from the instruction frictional braking force of the frictional braking device with the braking force to be generated by the regenerative braking device.

5. The braking control apparatus for the vehicle according to claim 4, wherein the braking control portion sets a gradient of the increase in the braking force to be generated by the frictional braking device according to a gradient of a reduction in the braking force to be generated by the regenerative braking device when the replacement control is started, and compensates for a braking force corresponding to a shift of the braking force to be generated by the frictional braking device with the braking force to be generated by the regenerative braking device.

6. The braking control apparatus for the vehicle according to claim 5, wherein the braking control portion generates a braking force corresponding to a difference between the calculated target braking force and the braking force to be generated by the regenerative braking device with use of the frictional braking device, before a vehicle speed reaches or falls below a predetermined vehicle speed.

7. A braking control apparatus for a vehicle, comprising:
a target braking force calculation portion configured to calculate a target braking force according to a brake operation amount input by a driver; and
a braking control portion configured to:
  i) issue a braking force instruction to a regenerative braking device and/or a frictional braking device provided to the vehicle so as to achieve the calculated target braking force,
  ii) change a braking force to be generated by the regenerative braking device so as to achieve the calculated target braking force, and generate a braking force corresponding to a difference between the braking force to be generated by the regenerative braking device and the target braking force with use of the frictional braking device, before a vehicle speed reaches or falls below a predetermined vehicle speed, and
  iii) perform replacement control by changing a braking force to be generated by the frictional braking device so as to achieve the calculated target braking force, generating a braking force corresponding to a difference between the braking force to be generated by the frictional braking device and the target braking force with use of the regenerative braking device, and compensating for a braking force corresponding to a shift of the actual frictional braking force from the instruction frictional braking force of the frictional braking device with the braking force to be generated by the regenerative braking device, when a vehicle speed reaches or falls below a predetermined vehicle speed.

8. The braking control apparatus for the vehicle according to claim 7, wherein
the braking control portion sets a gradient of an increase in the braking force to be generated by the frictional braking device according to a gradient of a reduction in the braking force to be generated by the regenerative braking device when the replacement control is started, and
compensates for a braking force corresponding to a shift of the braking force to be generated by the frictional braking device with the braking force to be generated by the regenerative braking device.

9. The braking control apparatus for the vehicle according to claim 8, wherein
the target braking force is calculated according to the brake operation amount input by the driver, and
the braking control portion performs the control so as to increase the braking force to be generated by the frictional braking device and reduce the braking force to be generated by the regenerative braking device, when the brake operation amount increases after the replacement control is started.

* * * * *